Dec. 29, 1970        J. T. SARVAY ET AL        3,550,242
                     LOCK STRIP INSERTING TOOL
Filed March 11, 1968                          2 Sheets-Sheet 1

INVENTORS.
J. THOMAS SARVAY
JOHN A. DALLEN
BY
Meyer, Tilberry & Body
ATTORNEYS.

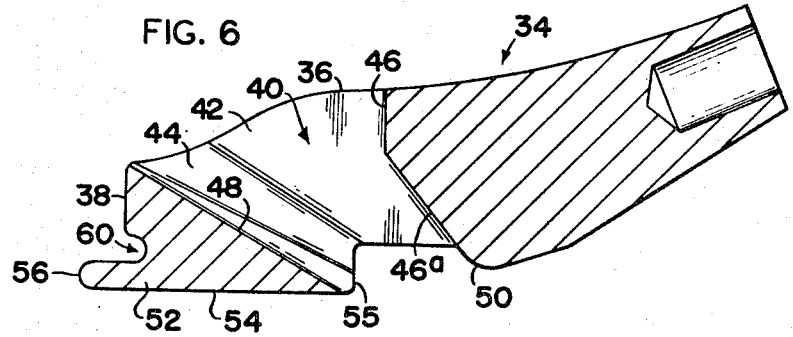
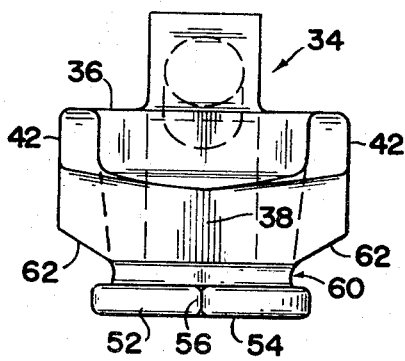
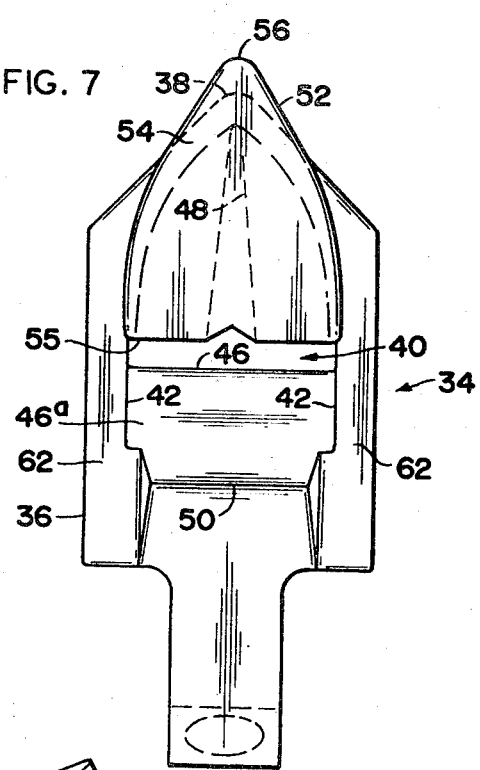
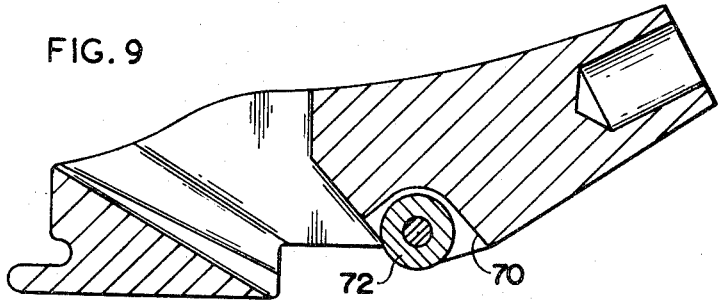

United States Patent Office 3,550,242
Patented Dec. 29, 1970

3,550,242
LOCK STRIP INSERTING TOOL
John Thomas Sarvay, Lakewood, Cuyahoga, and John A. Dallen, Port Clinton, Ottawa, Ohio, assignors to The Standard Products Company, Cleveland, Ohio, a corporation of Ohio
Filed Mar. 11, 1968, Ser. No. 712,205
Int. Cl. B23p 19/02
U.S. Cl. 29—235      10 Claims

ABSTRACT OF THE DISCLOSURE

A lock strip inserting tool for gasket installation having an aperture in the tool head through which the lock strip is fed. A wedging shoe on the lower surface of the tool head separates the walls of the groove in the gasket and a heel on the tool head presses the strip into the gasket. The tool may be used either manually or with an electric or pneumatic power source.

---

This invention relates to a tool for installing weather stripping gaskets or the like and, more particularly, to a tool specifically adapted for inserting the locking strip in a resilient gasket.

Resilient gaskets formed from elastomeric materials such as neoprene are widely used for mounting, sealing and cushioning panels such as sheet glass in a wall of a building or in automobile bodies. In general, such gaskets comprise opposed channel members separated by a cross web defining the bottom surfaces thereof. One channel member is adapted to receive a construction member such as a sheet of glass or a panel and the other is adapted to receive a frame member. The channel members are defined by outwardly extending, generally parallel walls or wings which may terminate at their extremities in inwardly directed lips adapted to sealingly engage the members inserted therebetween.

The attainment of a weather tight gasket seal is assisted by the provision of a groove running longitudinally of the gasket adjacent one wing of each of the opposed channels. The groove is adapted to receive a locking strip which urges the adjacent wings toward the frame and panel members.

The insertion of the locking strip in the groove of such gaskets is normally accomplished by use of a hand tool and this invention is directed to a tool especially adapted for this purpose; however, it is to be appreciated that the tool hereinafter disclosed may be utilized in any environment where a strip is to be inserted in a groove having resilient walls.

Tools for the insertion of locking strips in gaskets normally are manually operated and have employed some form of a tool head which separates the resilient walls of the groove while feeding the locking strip into the groove. One such typical prior art tool is illustrated in Maudlin Pat. No. 2,486,666 in which the tool is drawn through the groove thereby separating the sidewalls of the groove and the lock strip is fed through the handle of the tool and through the tool head into the groove. Another prior art form of such tool is the type wherein a tool head is pushed through the groove and the lock strip enters the groove through the tool head in a direction opposite to the direction in which the tool head is passing.

Several shortcomings have been experienced with the prior art type of tools heretofore employed. Thus, since all of the prior art tools were designed for manual operation, it has been necessary that the material from which the gasket is made be sufficiently resilient that the walls of the groove can be readily separated by an operator drawing or pushing the tool through the groove. If the material from which the gasket is formed is unduly rigid, it will be exceedingly difficult for the installer to insert the locking strip.

Another difficulty experienced with the prior art tools has been the time required to install the locking strips. Thus, the sliding engagement of the tool head with the walls of the groove does impede the progress of the tool through the groove and thereby inhibits the laying of the locking strip in the groove. Moreover, it frequently occurs with the prior art tools that the tool will pop out of the groove thus necessitating time delays while the tool is reinserted in the groove and the process of inserting the locking strip is recommended.

Another difficulty with the prior art tools has been the absence of any provision for firmly seating the locking strip in the groove. The prior art tools normally have provided means for separating the walls of the groove so that the strip may be laid in the groove; however, there has been a tendency for the strip to be less than firmly seated in the groove and there is always the possibility that the strip will, due to the resiliency of the walls of the groove, be forced out of the groove and a weather tight seal will not be obtained. Some efforts have been made to incorporate in the prior art tools a means for pressing the lock strip into the groove; however, these have not proved effective and most tools now being employed do not provide adequate means for assuring the firm seating of the lock strip in the gasket groove.

It is the primary object of this invention to provide a lock strip inserting tool which overcomes the problems heretofore experienced with such tools and which accomplishes the insertion of a continuous length of lock strip material into a gasket with less effort and increased speed.

Specifically, this invention contemplates a lock strip inserting tool which includes a body having a forwardly converging nose portion formed thereon. Extending from the upper surface of the body through to the lower surface of the body is an aperture which is shaped to receive and guide a lock strip therethrough. Shoe means are formed on the lower surface of the body with the shoe means being positioned forward of the aperture in the body. A heel portion projects from the lower surface of the body with the heel portion being positioned rearward of the aperture. The shoe has a width which corresponds approximately to the width of the aperture in the body and tapers forward beyond the nose of the body. A groove is defined between the shoe and the body which groove is adapted to receive the edges of the walls defining the groove in the gasket and maintain the walls separated to facilitate the entry of the locking strip. The heel terminates at a point above the lower surface of the shoe and is designed to ride on and press down the locking strip after it has been inserted in the gasket. The heel is also immediately adjacent to the point at which the shank is connected to the tool head and is adapted to receive a downward component of force which firmly seats the lock strip in position in the groove in the gasket.

Other features and advantages of the invention will become more apparent upon a complete reading of the following description which, together with the attached drawings, discloses but a preferred embodiment of the invention.

Referring to the drawings wherein like reference numerals indicate like parts in the various views:

FIG. 6 is a longitudinal sectional view through the tool head.

FIG. 7 is a bottom plan view of the tool head.

FIG. 8 is a front elevation view of the tool head.

FIG. 9 is a longitudinal sectional view similar to FIG. 6 showing a modification of the tool head.

Figure 1:
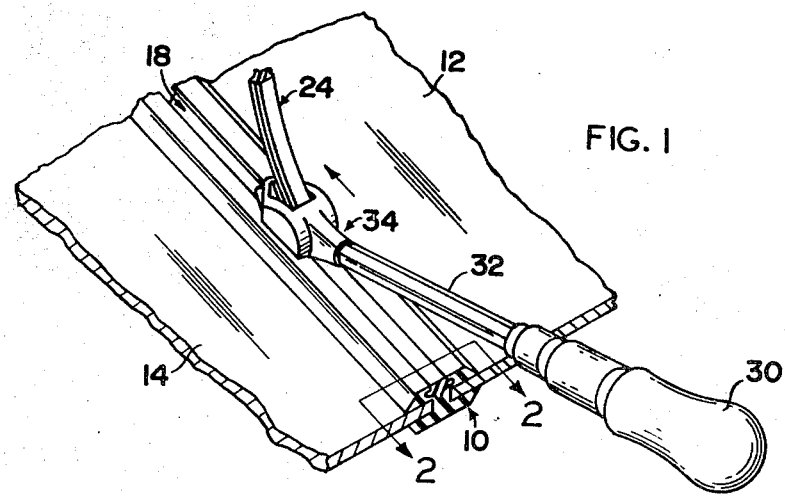
FIG. 1 is a perspective view illustrating the tool as it is being used to insert a lock strip in a gasket.

Referring first to FIG. 1 there is illustrated a typical gasket installation with which the instant tool is designed to be used. However, it is to be understood that the tool hereinafter described is in no way limited in its application to the specific gasket and lock strip illustrated with the particular gasket and lock strip being illustrated merely for purposes of facilitating an understanding of the invention.

Figure 2:
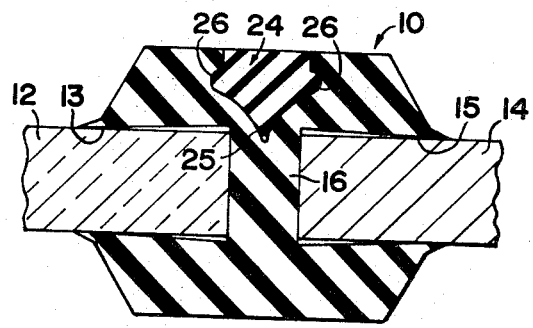
FIG. 2 is a sectional view along line 2—2 of FIG. 1 illustrating the lock strip inserted in the gasket.
Figure 3:
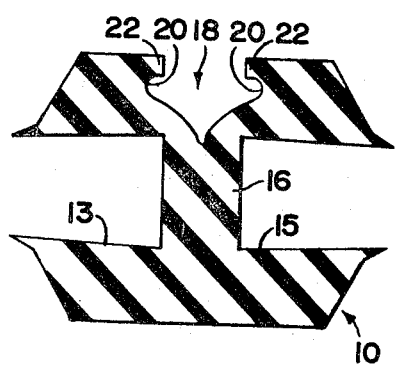
FIG. 3 is a section through a typical gasket before the lock strip has been inserted.
Figure 4:
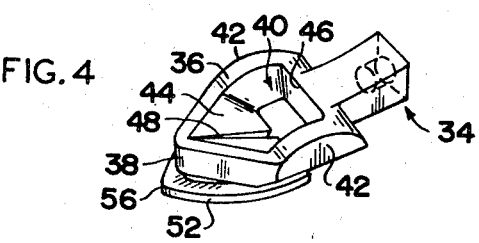
FIG. 4 is a perspective view of the head of the tool.
Figure 5:
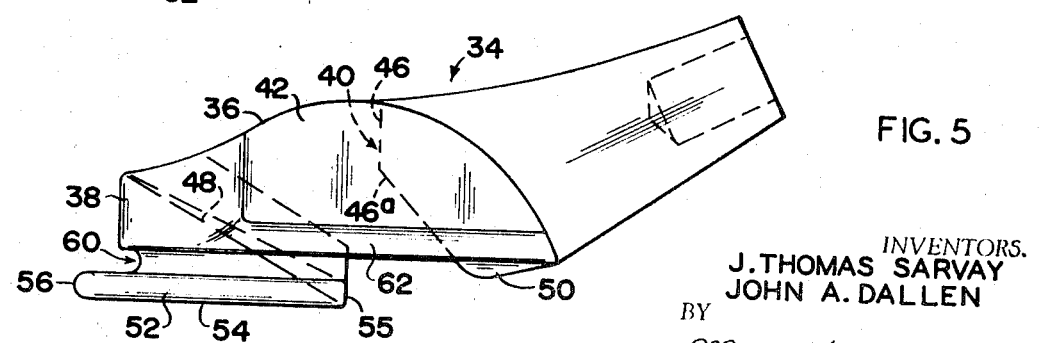
FIG. 5 is a side elevation view of the tool head.

A gasket 10 is designed to provide a weather tight seal between two members 12 and 14. The gasket comprises opposed channels 13, 15 separated by a cross web 16. The edge of one member 12 is adapted to be received in one channel 13 and the edge of the other member 14 is adapted to be received in the other channel 15 as illustrated in FIG. 2. The outer edges of the walls of the two channels may be provided with inwardly directed lips which are adapted to sealingly engage the two members 12, 14 inserted therebetween.

To assure the attainment of a weather tight seal between the two members 12, 14, there is provided in the gasket 10 a groove 18 which extends longitudinally of the gasket. The groove is of a generally V-shaped configuration with the side walls defining the groove being provided with opposed grooves 20 and lip portions 22. A lock strip 24 is adapted to be received in the groove 18 with longitudinal beads 26 formed on opposed sides of the strip 24 being adapted to be received in the grooves 20. As is well understood in the art, the lock strip thus maintains the walls of the groove 18 separated so that the walls of the channels in which members 12, 14 are received are maintained in sealing engagement with the members.

There is illustrated in FIG. 1, the tool as it is being employed in inserting the locking strip. Thus, the tool as shown in FIG. 1 employs a handle portion 30, a shank 32 and a tool head 34 secured to the shank. As shown best in FIGS. 4–8, the tool head 34 comprises a body portion 36 at the forward end of which there is formed a tapered nose portion 38. The rearward or trailing end of the body 36 opposite to the nose portion 38 is the point at which the shank 32 is connected to the tool head. The body 36 further includes a central aperture 40 which extends from the upper surface of the body, through the body and opening on the lower surface thereof. The aperture 40 is specially shaped to accommodate the particular configuration of the locking strip normally employed in gaskets of the type with which this invention is concerned. Thus the aperture 40 includes a pair of spaced side walls 42, a front wall 44 and a rear wall 46. The front wall 44 is V-shaped in cross section and inclines forwardly with a guide groove 48 formed in the center of the incline. The walls of the groove 48 diverge rearwardly so that the groove is smallest at the upper portion of the wall 44 and is widest at the lower end of the wall. Thus the surface of the wall 44 comprises a V-shaped surface adapted to support the locking strip with the groove 48 at the juncture of the sides of the V being adapted to serve as a guide for the strip in a manner hereinafter described.

The rear wall 46 includes a generally vertically extending section at the upper region of the aperture 40 and includes a rearwardly tapering portion 46a which is located in the lower region of the aperture 40. Immediately adjacent to and rearward of the surface 46a is a projection 50 on the lower surface of the body 36 which defines a heel portion for a purpose hereinafter described.

Depending from the lower surface of the body 36 is a generally triangular shaped wedge or shoe 52. The shoe 52 includes a flat bottom surface 54 and opposed side walls which converge forwardly from the trailing edge 55 of the shoe to define a nose or point 56. As is apparent from FIG. 5, the point 56 defined by the converging side walls of the shoe 52 extends beyond the nose portion 38 formed on the body 36. The width of the shoe 52 is slightly greater than the width of the aperture 40 in the body portion with the trailing edge 55 of the shoe corresponding to the point at which the aperture 40 intersects the lower surface of the body portion 36. The incline V-shaped surface 44 and the groove 48 extend through a portion of the trailing edge of the shoe 52 with the groove 48 intersecting the flat bottom surface 54 of the shoe. A groove or recess 60 is formed between the shoe and the body 36 with the recess 60 forming an undercut portion beneath the nose 38 and extending along either side of the body portion and terminating at the trailing edge 55 of the shoe. The opposed sides of the body 36 immediately above the groove 60 are beveled to form tapered shoulders 62 which extend rearward along the bottom surface of the body portion.

The shank 32 may be connected to the tool head in any appropriate manner; however, it is important that the shank join the head in a manner which forms an acute angle with the horizontal. In this manner, the thrust applied to the tool along the longitudinal axis of the shank includes not only a forward component of thrust which moves the tool along a horizontal path but also includes a vertical component of thrust which maintains the tool against its working surface and forces the heel 50 against the lock strip in a manner hereinafter described.

It is contemplated that the tool head will be coated with a friction reducing material such as a fluorocarbon resin, preferably TFE or FEP, of the type available from many firms including E. I. Du Pont de Nemours under the trademark Teflon. It is particularly desirable that the shoe 52 and the heel 50 receive the resin coating; however, it is most convenient merely to dip the tool head in the liquid resin which will result in coating of all of the surfaces of the tool head.

The described tool operates to insert a locking strip in the following manner. With the gasket in position between the two members 12 and 14 which are received in their respective channels 13, 15 in the gasket, the tool head is inserted in the groove 18. Since the groove 18 normally is at least partially collapsed when the members 12, 14 are received in their channels, the pointed portion 56 of the shoe facilitates the insertion of the tool head in the groove 18. Moreover, because the point 56 projects beyond the nose 38 on the body portion 36, the operator can more readily determine the position of the tool in the groove than if the nose 38 overlapping the point 56. The tool head is inserted in the groove 18 so that the peripheral edges of the shoe 52 are disposed in the recesses 20 in groove 18 thereby supporting the tool head in a substantially horizontal position spaced above the bottom of the groove 18. The lip portions 22 of the groove 18 are positioned in the groove 60 in the tool head and assist in maintaining the tool in groove 18. A length of flexible locking strip material is then inserted in the aperture 40 with the rib 25 which runs along the undersurface of the strip being received in the groove 48 thereby centering the locking strip in the aperture 40. Thereafter, thrust is applied to the handle of the tool and the tool is moved along the groove 18 with the peripheral edges of the shoe 52 cooperating with the recesses 20 to separate the walls of the groove and to guide the tool as it progresses along the gasket. As the tool head moves, the lock strip material is fed through the aperture 40 in the tool head and deposited in the groove 18 the walls of which, because of the wedging action of the shoe, have been separated thereby facilitating entry of the lock strip into the groove. As the lock strip is fed into the groove, the ribs 26 on either side of the lock strip are in position to be received in the grooves 20 of the gasket so that as the tool progresses along the gasket, the side walls of the groove which have been separated by the wedging action of the shoe 52 tend to return to their original position and thereby firmly grip the ribs 26 on the lock strip.

To assure the firm seating of the lock strip in the groove 18, the heel 50 of the tool head is designed to engage the upper surface of the lock strip and press the lock strip into the groove. This pressing action of the heel is achieved by the above-described vertical component of the thrust applied along the shank 32 of the tool.

FIG. 9 illustrates a modified form of heel construction which accomplishes the same function as heel 50. As shown in this figure, the heel portion is recessed at 70 with a roller 72 rotatably supported in the recess. The roller 72 reduces the frictional drag between the tool head and the gasket and thereby increases the facility with which a lock strip may be inserted.

It is thus apparent that the tool head is designed to separate the walls of the groove in the gasket and apply the locking strip in the groove in a manner such that the strip is firmly seated to provide the desired sealing characteristics.

Several advantages result from the tool heretofore described. Chief among these advantages is the increased speed and facility with which a lock strip may be inserted, thereby reducing the time and labor involved in installing gaskets of this type. Thus, the resin coating on the portions normally in contact with the rubber material of the gasket substantially reduces the friction normally present. Moreover, the friction is further reduced by the beveled shoulders 62 which taper away from the surface of the gasket and thereby prevent unnecessary contact between portions of the tool head and the gasket. Also, the likelihood that the tool will pop out of the groove during the installation process is materially reduced because of the cooperation of the tool head with the lock strip and the gasket. Thus, the lock strip, by being fed into the groove in the gasket through the head, in effect tends to exert a force maintaining shoe 52 of the head in the grooves 20 of the gasket. Moreover, the tool head is maintained on a substantially horizontal path of movement because of the engagement between the heel 50 and the substantially flat upper surface of the inserted lock strip. As a result, any tendency of the tool head to become displaced from the groove is materially reduced, thereby avoiding unnecessary delays which normally have occurred heretofore in continually restarting the tool after it has been displaced from the groove.

Another advantage of the tool head is its adaptability to a wide diversity of materials and sizes of gaskets and lock strips. With the tool head described, the only limitation on the size of lock strip with which the tool may be used is that the transverse dimension of the lock strip be such that the lock strip may pass through the aperture 40. The tool head may be used with lock strips substantially smaller in dimension since the aperture 40 includes the guide groove 48 which assures the centering of the lock strip in the groove during the insertion process. The tool does not rely upon the side walls of the aperture 40 to perform this centering and guiding function. As a result, the tool may be used with various sizes of lock strips and it is unnecessary to have a separate tool for each size of lock strip. Moreover, the tool may be used with gasket materials which have been heretofore considered too stiff or rigid for the manual insertion of the lock strip. Thus, the tool head is readily adaptable to any type of electric or pneumatic power source with the only requirement being that the power source provide a longitudinal thrust along the shank of the tool. As a result, the tool may be used with relatively rigid gasket material with the electric or pneumatic power source providing the power to force the tool head along the groove in the gasket and deform the walls of the groove so that the lock strip may be received therein.

For ease of description, the principles of the invention have been set forth in connection with but a single illustrated embodiment. It is not our intention that the illustrated embodiment or the terminology employed in describing it be limiting in as much as variations of these may be made without departing from the spirit of the invention. Rather it is our desire to be restricted only by the scope of the appended claims.

Having thus described our invention, we claim:

1. A lock strip inserting tool for inserting locking strips in the groove of a gasket, said tool comprising:
   a body having upper and lower surfaces thereon,
   an aperture extending from the upper surface of said body through said body and exiting at the lower surface thereof with said aperture being shaped to receive a locking strip therethrough,
   shoe means depending from the lower surface of said body with said shoe means lying in a plane spaced from the plane of said body and being positioned on said body axially forward of the exit end of said aperture,
   said shoe means being adapted to be received in and spread the walls of the groove of a gasket, and
   a heel portion on the lower surface of said body with said heel portion being positioned rearward of said exit end of said aperture.

2. The tool of claim 1 wherein at least said shoe means and said heel portion are coated with a friction reducing material.

3. A lock strip inserting tool for inserting locking strips in the groove of a gasket, said tool comprising:
   a body having upper and lower surfaces thereon,
   an aperture extending from the upper surface of siad body through said body and exiting at the lower surface thereof with said aperture being shaped to receive a locking strip therethrough,
   shoe means depending from the lower surface of said body with said shoe means lying in a plane spaced from the plane of said body,
   said shoe means being adapted to be received in and spread the walls of the groove of a gasket, and
   a heel portion on the lower surface of said body with said heel portion being positioned across said exit end of said aperture from said shoe means,
   said body including a forwardly converging nose portion formed thereon and said shoe means including forwardly converging peripheral edges with the nose portion on said body terminating rearward of the point of convergence of said edges of said shoe means.

4. A lock strip inserting tool for inserting locking strips in the groove of a gasket, said tool comprising:
   a body having upper and lower surfaces thereon,
   an aperture extending from the upper surface of said body through said body and exiting at the lower surface thereof with said aperture being shaped to receive a locking strip therethrough,
   shoe means depending from the lower surface of said body with said shoe means lying in a plane spaced from the plane of said body,
   said shoe means being adapted to be received in and spread the walls of the groove of a gasket, and
   a heel portion on the lower surface of said body with said heel portion being positioned across said exit end of said aperture from said shoe means,
   a groove being formed at the juncture of said shoe means and said body with said groove extending on either side of said shoe means and said body.

5. The tool of claim 1 wherein said aperture includes a forward end wall defining an inclined surface.

6. A lock strip inserting tool for inserting locking strips in the groove of a gasket, said tool comprising:

a body having upper and lower surfaces thereon, an aperture extending from the upper surface of said body through said body and exiting at the lower surface thereof with said aperture being shaped to receive a locking strip therethrough, shoe means depending from the lower surface of said body with said shoe means lying in a plane spaced from the plane of said body, said shoe means being adapted to be received in and spread the walls of the groove of a gasket, and a heel portion on the lower surface of said body with said heel portion being positioned across said exit end of said aperture from said shoe means, said aperture including a forward end wall defining an inclined surface including a groove formed centrally therein.

7. The tool of claim 4 wherein said body includes a beveled shoulder along either side thereof adjacent to said groove.

8. The tool of claim 3 wherein a groove is formed at the juncture of said shoe means and said body with said groove extending along either side of said shoe means and said body, said aperture including a forward end wall defining an inclined surface, and a groove extending centrally of said inclined surface.

9. A lock strip inserting tool for inserting locking strips in the groove of a gasket, said tool comprising:

a body having upper and lower surfaces thereon, an aperture extending from the upper surface of said body through said body and exiting at the lower surface thereof with said aperture being shaped to receive a locking strip therethrough, shoe means depending from the lower surface of said body with said shoe means lying in a plane spaced from the plane of said body, said shoe means being adapted to be received in and spread the walls of the groove of a gasket, and a heel portion on the lower surface of said body with said heel portion being positioned across said exit end of said aperture from said shoe means, said shoe means lying in a plane generally parallel to the horizontal axis of said body, said shoe means being generally wedge-shaped in configuration, a groove formed at the juncture of said shoe means and said body with said groove extending on either side of said shoe means and said body and terminating at said aperture, said aperture including a forward end wall defining an inclined surface, and a groove in said inclined surface extending centrally thereof.

10. The tool of claim 1 wherein said heel portion includes roller means rotatably supported for rolling engagement with the locking strip.

References Cited
UNITED STATES PATENTS

| | | | |
|---|---|---|---|
| 1,496,239 | 6/1924 | Lynch | 29—270 |
| 2,189,138 | 2/1940 | Eichner | 29—235X |
| 2,486,666 | 11/1949 | Maudlin | 29—270 |
| 2,533,367 | 12/1950 | Gruszecki | 29—235X |
| 2,976,257 | 3/1961 | Dawe | 117—132CF |
| 3,448,508 | 6/1969 | Passage | 29—235 |

ROBERT C. RIORDON, Primary Examiner

J. C. PETERS, Assistant Examiner